United States Patent [19]

Chang

[11] Patent Number: 5,200,091
[45] Date of Patent: Apr. 6, 1993

[54] PROCESS TO RECOVER SALT FROM BRINE WASTE WATER

[76] Inventor: Chang S. Chang, 2F, No. 3, Alley 10, Lane 304, An Ieh Road, Yung Ho City, Taipei Hsien, Taiwan

[21] Appl. No.: 788,850

[22] Filed: Nov. 7, 1991

[51] Int. Cl.$^5$ ............................................. B01D 17/06
[52] U.S. Cl. ............................... 210/748; 204/157.5; 423/499.5
[58] Field of Search ...................... 210/748; 204/157.5; 423/499; 23/303

[56] References Cited

U.S. PATENT DOCUMENTS 3,925,027 12/1975 Fiedelman .......................... 423/499

FOREIGN PATENT DOCUMENTS 592751 2/1978 U.S.S.R. ............................... 423/499

Primary Examiner—Bernard Nozick
Attorney, Agent, or Firm—Yuso Int'l Patent and Trademark Office

[57] ABSTRACT

The process to recover salt from brine waste water. By using the differentiation in the absorption and transmission of the infrared beam between sodium chloride or potassium chloride and organic compounds, the method of irradiating the salt crystals with infrared beam is used to vaporize and disintegrate the organic compounds on their surfaces. This method provides more economic and effective means of purifying salts from brine waste water containing high concentration of organic compounds.

1 Claim, 1 Drawing Sheet

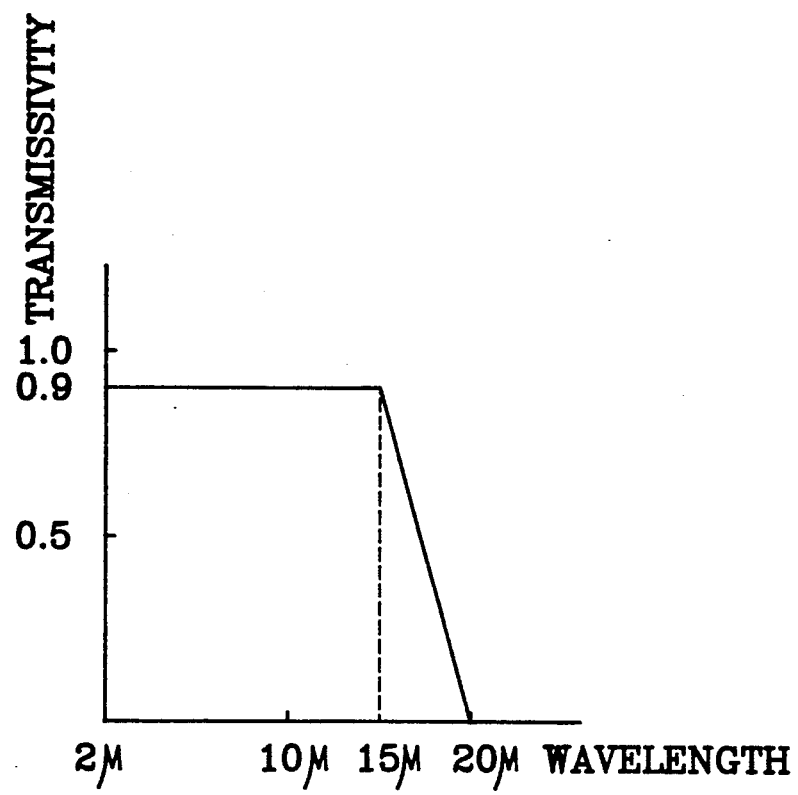
F I G . 1
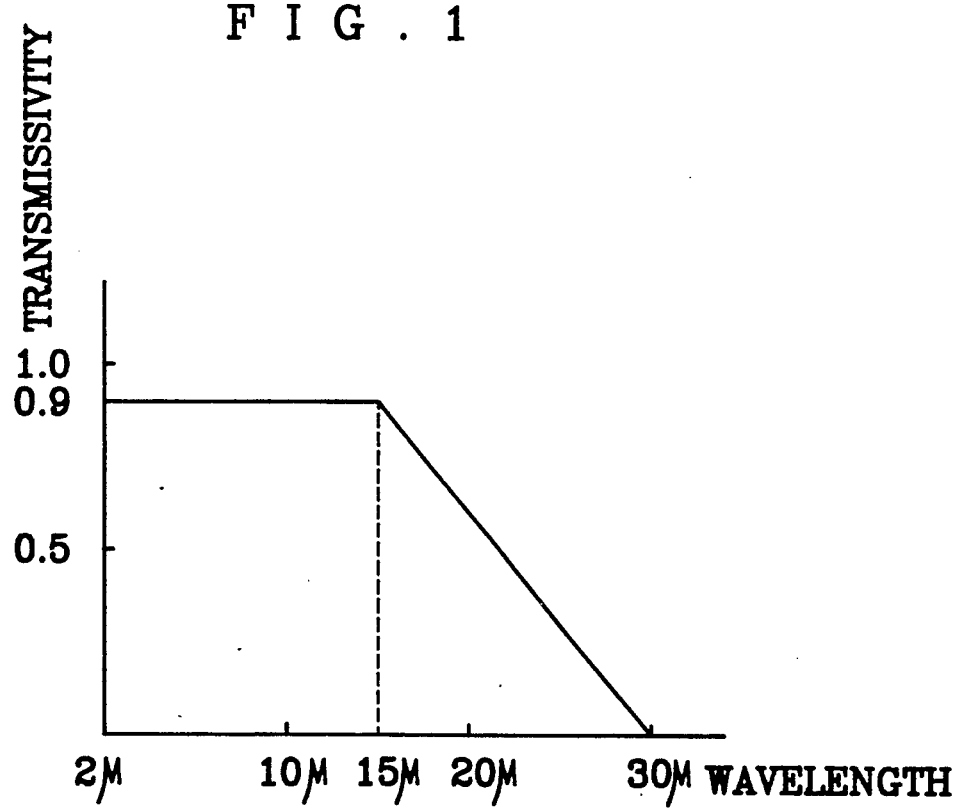
F I G . 2

PROCESS TO RECOVER SALT FROM BRINE WASTE WATER

BACKGROUND OF THE INVENTION

Waste water of high salt content is a common product of various chemical industry. For examples, in the dyestuff factory the typical salt contents in the waste water are as follows:

| | |
|---|---|
| NaCl (or KCl) | ca. 20% |
| COD | ca. 100,000 ppm |
| Na$_2$SO$_4$ | trace. |

In the Epoxy Resin industry, the waste water contains the various salts indicated in the following:

| | |
|---|---|
| NaCl | 20% |
| NaOH | 1% |
| NaHPO$_4$ | 0.05% |
| Glycerine | 0.07–0.15% |
| MIBK | 0.7–1.0% |
| Polymer/Resin | 0.03–0.05% |
| COD | 30,000 ppm. |

In the Polycarbonate factory, the salt contents in the waste water are:

| | |
|---|---|
| NaCl | 19% |
| NaOH | 25–30 mg/L |
| Fe++ | 0.37 mg/L |
| Ca++ | 2.0 mg/L |
| Total organics | <224 ppm |
| Sodium gluconate | <200 ppm |
| Methylene choloride | <1 ppm. |
| Triethylamine | <0.35 ppm. |
| Phenolics as BPA | <0.77 ppm. |

To process such waste water of high salt contents, the biological systems are not applicable unless the concentration of salts in the water is lowered. Current method is to recover the salts from the waste water to enable the latter to contain lower concentration of salts and be processable by the biological system. The process of recovering salts form such waste water is divided into two parts, e.g., crystallization and heat treatment. In the process of crystallization, the waste water is concentrated to precipitate the growth of the crystals. When the crystals grow to 300–500 μm, they are separated from the liquid phase. Because the final concentration of the liquid before separating the crystals is very high, the surfaces of the crystals are coated with a layer of organic compounds. With one to two molecule thickness. To rid of these organic compounds, the crystals are further treated with heat. Currently, there are two methods of heat treatment to purify these salt crystals, e.g. direct calcination and hot air. The former directly utilizes flame to calcinate the coated organic compounds. Because its temperature (1.941° C.) exceeds the melting point of sodium chloride (800°C.), calcination requires another equipment to recrystallize the molten salts.

In the hot air method, the heat is transferred by convection. And the heat flux of convection $q_c$, equal to $h_c \times \Delta T$ $h_c$:heat convection coefficient or film coefficient
$\Delta T$:temperature difference Both velocity of hot air wind and temperature difference have a significant effect upon the rate of heat transfer. As a result to consequences can be predicted.

(1) Higher velocity and degree of turbulence decrease the thickness of Laminar Sublayer surrounding the crystals and accelerate heat transfer.

(2) The driving force is proportional to temperature difference.

However, to prevent overheating the crystals, the crystals are heated with hot air to increase the temperature of the system not to exceed a set point such as 600° C. to vaporize or decompose the organics but not melt the crystals. According to Arrhenius equation, $$K = Ae^{-\frac{E}{R_gT}}$$

K:specific rate constant
A:freuqency factor
E:activation energy
T:temperature
Rg:gas constant It is clear that the higher the temperature, the more efficient the decomposition. However, to avoid the crystals from melting, the temperature of the system is not to exceed certain level. This limitation leads to the suboptimal heat transfer rate and decomposition rate which becomes an inherent drawback of this method.

SUMMARY OF THE INVENTION

In view of the above problems of heat treatment methods, the present invention is developed. The purpose of this invention is to enhance the effect of heat treatment in the process of salt recovering from the brine waste water. It is based on the differentiation in the absorption and transmission of infrared beam between sodium chlorides or potassium chlorides and various organic compounds. The transmissivity, absorptivity and reflectivity of alight wave by the irradiated matter vary according to its wave length. In theory, the sum of the transmissivity, the absorptivity and the reflectivity equals to one. In sodium chloride and potassium chloride (reference to FIG. 1 and FIG. 2) (5 mm thickness) the transmissivity of a infrared beam of the wave length between 2 μm to 15 μm is near 1 and the absorptivity almost 0.

The thicker of slice, the less of transmission.

BRIEF DESCRIPTION OF THE DRAWINGS

FIG. 1 Show 5 mm thickness sodium chloride transmissivity of a infrared beam of the wave length.

FIG. 2 Show 5 mm thickness potassium chloride transmissivity of a infrared beam of the wave length.

DETAILED DESCRIPTION

On the contrary, the organic compounds has much higher absorptivity in the same wave length range. The absorption ranges of infrared light by organic chemical bond is distributed as follows:

| | |
|---|---|
| C—C, C—O, C—N | 7.7–12.5 μm |
| C=C, C=O, C=N, N=O | 5.3–6.7 μm |
| C≡C, C≡N, | 4.4–5.0 μm |
| C—H, O—H, N—H | 2.6–3.7 μm |

Because of the difference in the absorptivity of the irradiating infrared beam with wave length between 2

μm and 15 μm, the organic compounds on the crystal surface can be heated to higher temperature while the crystal remain lower in temperature. The driving force of heating by irradiation with infrared light is the amount of heat absorbed, which is in proportion to radiation heat flux, $q_r \text{Kcal/m}^2\text{hr} = 4.786 \times 10^{-8} \times (T_s^4 - T_r^4) \times F_e \times F_a$ $T_s$: absolute temperature of source in degrees Kelvin
$T_r$: absolute temperature of receiver in same units
$F_e$: emissivity
$F_a$: arrangement factors Because the heat flux is proportional to the quadruple of the absolute temperature, when irradiated with the infrared beam, the temperature of the organic compounds on the surface is raised to hither level while the temperature of the crystals remains low due to the difference of absorbability, the driving force to decompose the organic compounds on crystal surface is enhanced to compare with the hot air method.

This invention is confined to the application of the infrared beam to vaporize or decompose the coated organic compounds on sodium chloride or potassium chloride crystals. It is used in recovering salt from brine waste water of high salt contents, it is not limited to any infrared device.

Any method using such principle to achieve further purification of salt crystals belongs to this patent. This invention, heretofore, has not been described in any publicly announced document and thus, is entitled to be patented.

We claim:

1. The process to recover salt from Brine waste water, using infrared light to vaporize or decompose the organic compounds coated on the surfaces of sodium chloride or potassium chloride crystals whereby to purify above salt crystals, regardless of the type of infrared equipment.

* * * * *